United States Patent
Inoue et al.

(10) Patent No.: US 6,608,803 B2
(45) Date of Patent: Aug. 19, 2003

(54) RECORDING MEDIUM REPRODUCTION APPARATUS

(75) Inventors: Hideo Inoue, Mitaka (JP); Saiji Tutiya, Fuchu (JP); Yasunobu Shimizu, Tokyo (JP); Kenji Oniki, Musashino (JP)

(73) Assignee: Teac Corporation, Tokyo (JP)

( * ) Notice: Subject to any disclaimer, the term of this patent is extended or adjusted under 35 U.S.C. 154(b) by 331 days.

(21) Appl. No.: 09/733,143

(22) Filed: Dec. 8, 2000

(65) Prior Publication Data

US 2001/0017829 A1 Aug. 30, 2001

(51) Int. Cl.$^7$ .................................................. G11B 7/00
(52) U.S. Cl. ..................................................... 369/47.23
(58) Field of Search ............................. 369/47.2, 47.21, 369/47.23, 47.26, 47.27, 47.28

(56) References Cited

U.S. PATENT DOCUMENTS 6,343,055 B1 * 1/2002 Ishii et al. ................ 369/47.23

* cited by examiner

*Primary Examiner*—Nabil Hindi
(74) *Attorney, Agent, or Firm*—Anderson Kill & Olick, P.C.; Eugene Lieberstein; Michael N. Meller

(57) ABSTRACT

The present invention provides a recording medium reproduction apparatus that can continuously reproduce different tunes from recording media at the same numbers of beat and the same beat timing. The recording medium reproduction apparatus includes: a first recording medium reproduction unit; a second recording medium reproduction unit; and a control unit that compares the number of beats per unit time of a tune reproduced from a first recording medium with the number of beats per unit time of a tune reproduced from a second recording medium, and adjusts the reproduction rate of the second recording medium reproduction unit so that the number of beats per unit time of the second recording medium reproduction unit becomes equal to the number of beats per unit time of the first recording medium reproduction unit. With this recording medium reproduction apparatus, any two different tunes to be reproduced from recording media can be adjusted to have the same number of beats and thus reproduced without intermission.

2 Claims, 9 Drawing Sheets

RECORDING MEDIUM REPRODUCTION APPARATUS

BACKGROUND OF THE INVENTION

1. Field of the Invention

The present invention generally relates to recording medium reproduction apparatuses, and, more particularly, to a recording medium reproduction apparatus that has a special reproduction function for remixing music recorded on a recording medium, such as a CD player.

2. Description of the Related Art

Conventionally, record players have been used in places like discotheques, where people enjoy dancing to music. Normally, two record players are used at the same time so as not to allow any intermission between tunes. However, in a case where two tunes having different numbers of beats are to be played, there will be an unnatural intermission between the tunes, casting a damper on the pleasure of dancing.

To avoid such a problem, those who handle sound equipment, i.e., disk jockeys, memorize the number of beats of each tune in advance, and then select records in such a replay order that natural reproduction of tunes can be achieved. In order to count the number of beats of a tune, it is necessary to detect a BPM (beat per minute). A disk jockey replays each tune in advance, so as to count the number of beats by tapping in time with the beats.

A natural transition from one tune to another can be achieved by matching the beat timing of the two tunes. Therefore, a disk jockey listens to each tune carefully so as to start replaying the tune at the same beat timing as the previous tune.

However, the above operations, such as the beat detection and beat matching, require a great power of attention and patience, as well as a talent as a disk jockey. As a result, it has been extremely difficult for a general user to perform continuous replay of tunes having different beat timings.

Furthermore, the beat timing matching operation described above is conventionally performed with record players, not with compact disk players and other recording medium reproduction apparatuses. Except for record players, there has been no recording medium reproduction apparatuses that are provided with a beat timing matching function for continuous reproduction.

SUMMARY OF THE INVENTION

A general object of the present invention is to provide recording medium reproduction apparatuses in which the above disadvantages are eliminated.

A more specific object of the present invention is to provide a recording medium reproduction apparatus that can continuously replay tunes having different beat numbers and beat timings reproduced from recording media.

The above objects of the present invention are achieved by a recording medium reproduction apparatus, comprising: a first recording medium reproduction unit; a second recording medium reproduction unit; and a control unit that compares the number of beats per unit time of a tune reproduced from a first recording medium with the number of beats per unit time of a tune reproduced from a second recording medium, and adjusts the reproduction rate of the second recording medium reproduction unit so that the number of beats per unit time of the second recording medium reproduction unit becomes equal to the number of beats per unit time of the first recording medium reproduction unit.

With this recording medium reproduction apparatus, the reproduction rate of the second recording medium reproduction unit is adjusted so that the number of beats at the second recording medium reproduction unit becomes equal to the number of beats at the first recording medium reproduction unit, as described above. Thus, any two tunes having different numbers of beats can be continuously reproduced from recording media.

In the above recording medium reproduction apparatus:

the first recording medium reproduction unit includes a first beat detector that detects beats of a tune being reproduced from the first recording medium;

the second recording medium reproduction unit includes a second beat detector that detects beats of a tune being reproduced from the second recording medium; and the control unit adjusts the reproduction rate of the second recording medium reproduction unit so that a beat detecting timing of the second beat detector becomes equal to a beat detecting timing of the first beat detector.

As described above, the reproduction rate of the second recording medium reproduction unit is adjusted so that the beat detecting timing of the second beat detector becomes equal to the beat detecting timing of the first beat detector. Thus, any two different tunes can be continuously reproduced from recording media at the same beat timing.

The above and other objects and features of the present invention will become more apparent from the following description taken in conjunction with the accompanying drawings.

DESCRIPTION OF THE PREFERRED EMBODIMENTS

The following is a description of embodiments of the present invention, with reference to the accompanying drawings.

Figure 1:
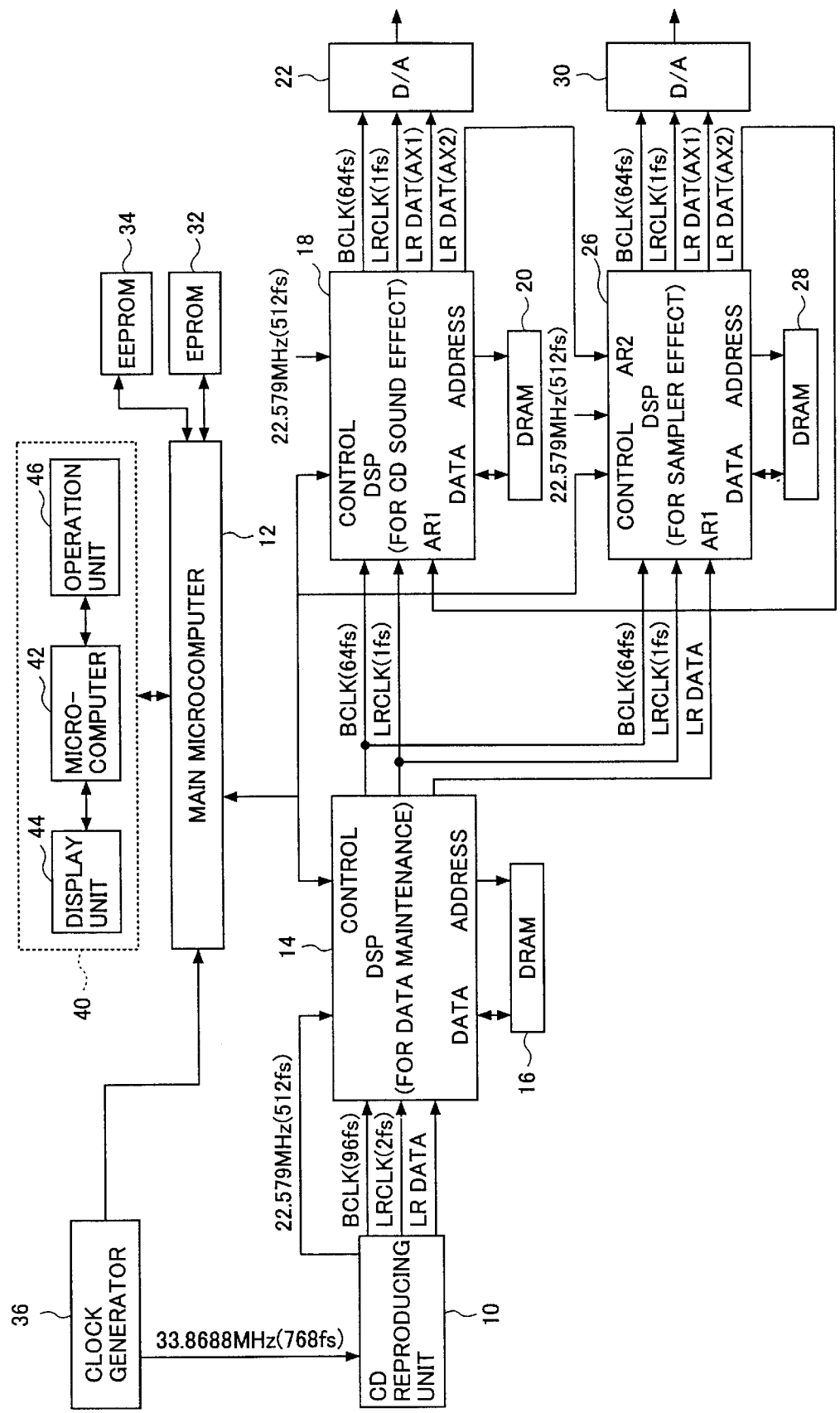
FIG. 1 is a block diagram of one embodiment of a recording medium reproduction apparatus of the present invention.

FIG. 1 is a block diagram of one embodiment of a recording medium reproduction apparatus of the present invention. In this figure, a CD reproduction unit 10 rotationally drives a compact disk (CD) that is a recording medium at a reproduction rate twice as high as a normal reproduction rate (double rate). A reproduction signal reproduced by a pickup of the CD reproduction unit 10 is supplied to a CD reproduction digital signal processor (DSP) in the CD reproduction unit 10 via an RF amplifier. In the CD reproduction DSP, a signal processing operation, such as an EFM (eight-to-fourteen modulation) operation or a CIRC (cross-interleave Reed-Solomon code) decoding operation, is performed on the reproduction signal.

A sub code is extracted and separated from the reproduction signal, and a decoding operation is performed on the sub code. The sub code data is stored in the RAM in a main microcomputer 12, in accordance with a counter signal supplied from the main microcomputer 12. The audio data processed by the CD reproduction DSP is supplied to a data maintenance DSP 14.

The data maintenance DSP 14 is connected to a DRAM (dynamic RAM) 16 for storing the audio data. Here, the data maintenance DSP 14 serves as a memory controller. The DRAM 16 stores the supplied audio data for ten seconds for instance, and serves to realize various functions, such as an anti-shock function for providing protection when a sound jump is caused due to a defect in the audio data, a quick start function for instantly starting a desired tune, a seamless loop function for repeatedly reproducing the audio data between predetermined two points, a scratch function, a function for changing the tempo of each tune, and a brake function for gradually reducing the reproduction rate and then stopping the reproduction.

The data maintenance DSP 14 writes audio data read out at a double rate into the DRAM 16 in accordance with the counter signal supplied from the main microcomputer 12. At the same time, the data maintenance DSP 14 reads out audio data at a single rate in accordance with the counter signal supplied from the main microcomputer 12, and supplies the read audio data to a CD sound effect DSP 18.

The CD sound effect DSP 18 is connected to a work memory DRAM 20, and performs various effect adjustment operations, such as key adjustment, output level adjustment, and voice reduction for reducing only the volume of the vocal part of a tune. The audio data outputted from the DSP 18 is supplied to a D/A converter 22 via a digital filter, and also to a sampler effect DSP 26.

The sampler effect DSP 26 is connected to a data storage DRAM 28, and serves as a memory controller. The DRAM 28 is capable of storing audio data for ten seconds, for instance. The sampler effect DSP 26 performs a sampler operation. More specifically, the audio data picked up during a period between a sampling start point and a sampling end point designated by user is stored in the DRAM 28. The stored audio data is read out at a reproduction timing that is also determined by the user, and then supplied to a D/A converter 30 and the DSP 18. The DSP 18 mixes its own output audio data with the audio data from the DSP 26, and then supplies the resultant mixture of audio data to a D/A converter 22.

The main microcomputer 12 is connected to an EPROM (erasable programmable ROM) 32 in which programs and data used for performing operations are stored, and to an EEPROM (electric erasable programmable ROM) 34 in which various setting values, such as tempo values and loop points, are stored for each tune (or each track). A clock generator 36 generates a clock signal, and supplies the clock signal to the CD reproduction unit 10 and the main microcomputer 12.

The main microcomputer 12 also reads out a sub code from a built-in RAM in accordance with the counter signal, and supplies the sub code to a microcomputer 42 in a controller unit 40. The microcomputer 42 converts the sub code into a time code, and displays the time code on a display unit 44. The controller unit 40 includes an operation unit 46 that has various operation keys for users to handle, and is connected to the microcomputer 42.

Figure 2:
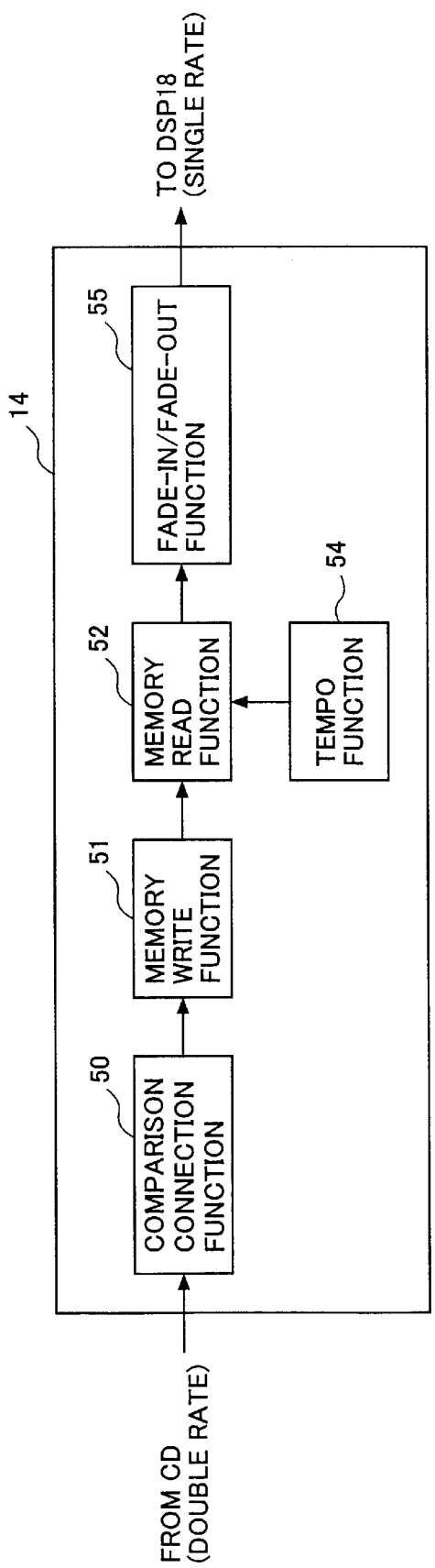
FIG. 2 is a block diagram showing the functions of a data maintenance DSP shown in FIG. 1.
Figure 3:
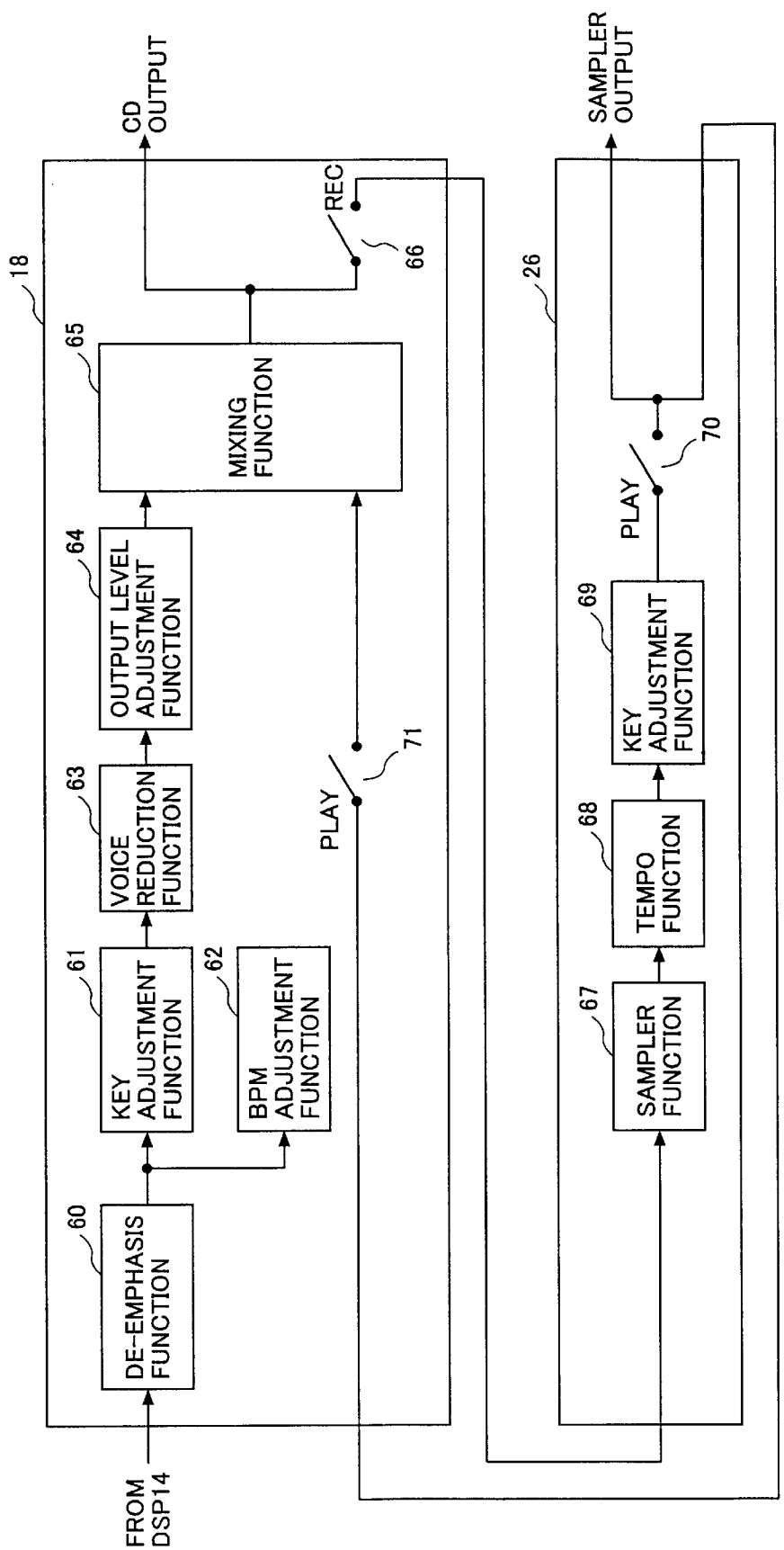
FIG. 3 is a block diagram showing the functions of a CD sound effect DSP and a sampler effect DSP shown in FIG. 1.

FIGS. 2 and 3 are block diagrams showing the functions of the DSPs 14, 18, and 26. As shown in FIG. 2, a comparison and connection function 50 of the DSP 14 compares audio data read out at the double rate with the last data stored in the DRAM 16, in accordance with the counter signal supplied from the main microcomputer 12. After the comparison, the read audio data is connected to the last data in the DRAM 16. A memory write function 51 writes the connected audio data into the DRAM 16. A memory read function 52 reads out audio data from the DRAM 16. A tempo function 54 changes the read rate of the memory read function 52, thereby adjusting the tempo. A fade-in/fade-out function 55 adjusts the level of audio data at a time of fade-in or fade-out.

In FIG. 3, a de-emphasis function 60 of the DSP 18 carries out a de-emphasis operation for canceling emphasis at the time of CD recording. A key adjustment function 61 changes the keys while fixing the tempo. A BPM (beats per minute) function 62 counts the number of beats per minute in each tune. A voice reduction function 63 reduces the volume of the vocal part of each tune. An output level adjustment function 64 adjusts the output level. The audio data outputted from the output level adjustment function 64 is outputted via a mixing function 65, and supplied to a sampler function 67 in the DSP 26 when a switch 66 is on.

The sampler function 67 writes audio data into the DRAM 28, and reads out audio data from the DRAM 28 when a switch 70 is on. A tempo function 68 adjusts the tempo of the audio data supplied from the sampler function 67. A key adjustment function 69 changes the keys while fixing the tempo. The audio data outputted from the key adjustment function 69 is outputted via the switch 70, and supplied to the mixing function 65 via a switch 71 that is switched on with the switch 70. In the mixing function 65, the audio data outputted from the key adjustment function 69 is mixed with the audio data outputted from the output level adjustment function, and the mixed audio data is outputted from the mixing function 65.

Figure 4:
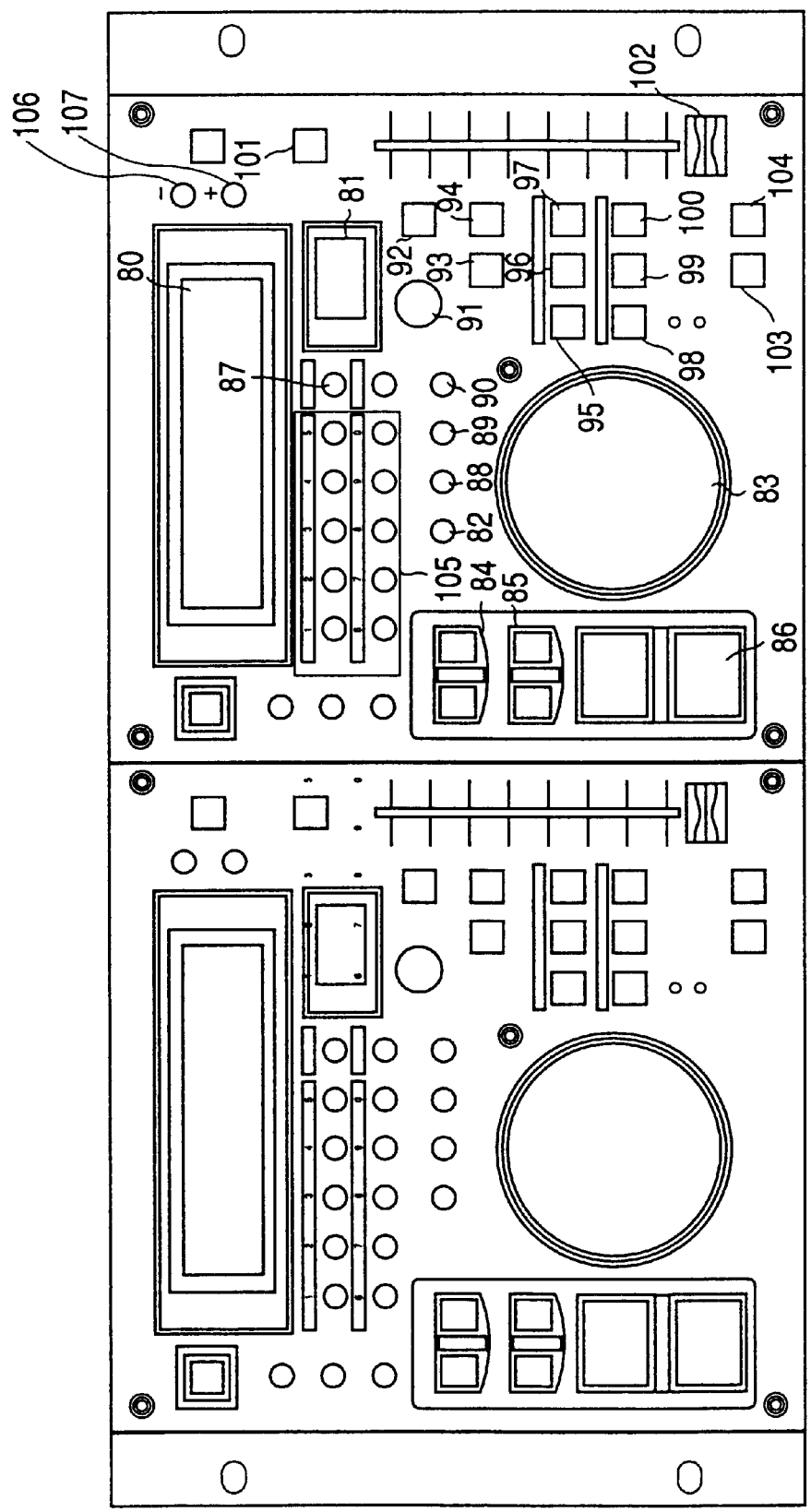
FIG. 4 is a plan view of controller units of a pair of recording medium reproduction apparatuses of the present invention.

It should be understood that the recording medium reproduction apparatus shown in FIG. 1 is used in pairs, and the main microcomputer 12 of each of the recording medium reproduction apparatuses transmits and receives information to and from each other. FIG. 4 is a plan view of the controller units 40 of a pair of recording medium reproduction apparatus. Since both of the controller units 40 have the same structure, reference numerals are allotted to only one of the controller units 40 in FIG. 4.

In FIG. 4, a display 80 of the display unit 44 displays various information including a track number and a time code, while a display 81 shows a BPM value. The operation unit 46 is equipped with a preset key 82, a jog dial 83, a skip key 84, a search key 85, a play/pause key 86, a bank key 87, a memory key 88 a recall key 89, an enter key 90, a TAP key 91, a BPM key 92, a tempo SYNC key 93, a beat SYNC key 94, a loop key 95, an A key 96, a B key 97, a sample key 98, an IN key 99, an OUT key 100, a tempo key 101, a tempo volume indicator 102, a scratch key 103, a brake key 104, a ten key board 105, a minus key 106, and a plus key 107.

Figure 5:
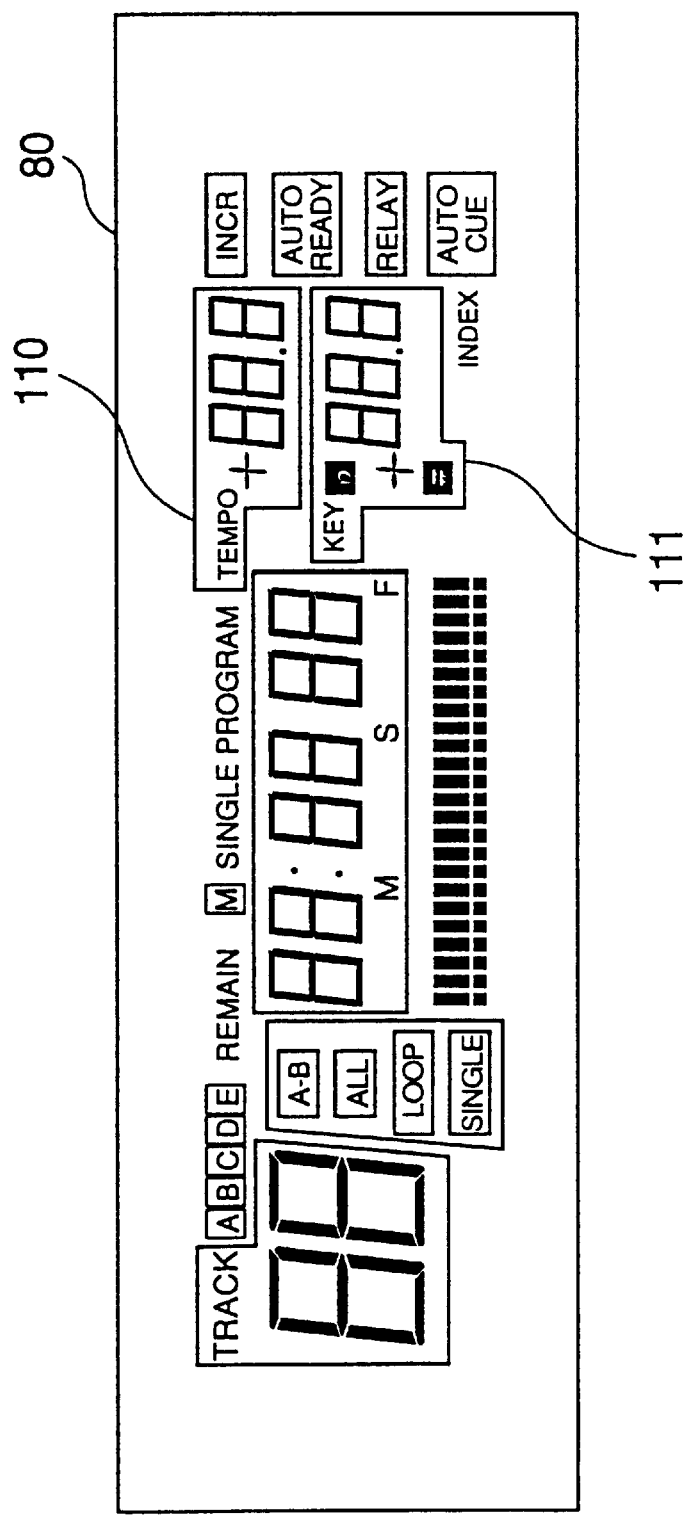
FIG. 5 shows the structure of a display shown in FIG. 4.

FIG. 5 shows the display 80 of the display unit 44 in greater detail. In FIG. 5, the display 80 includes a tempo indicator 110 for tempo control and a key indicator 111 for key control. The values indicated by each of the indicators 110 and 111 is shown by the percent. The tempo control is carried out by slidably moving the tempo volume 102 so as to adjust the tempo, i.e., the reproduction rate, of each tune being reproduced. With a normal reproduction rate being 1, the largest possible variable range of the reproduction rate is 32%. As the tempo is changed, the key of the tune being reproduced depending on the temp is changed.

The key control is performed by changing the key of each tune being reproduced while fixing the tempo. There are two adjustment methods: one is to change the key by the predetermined percent, depending on the number of times the minus key 106 or the plus key 107 is pushed; and the other is to change the key by the half, depending on the number of times the minus key 106 or the plus key 107 is pushed.

Figure 6:
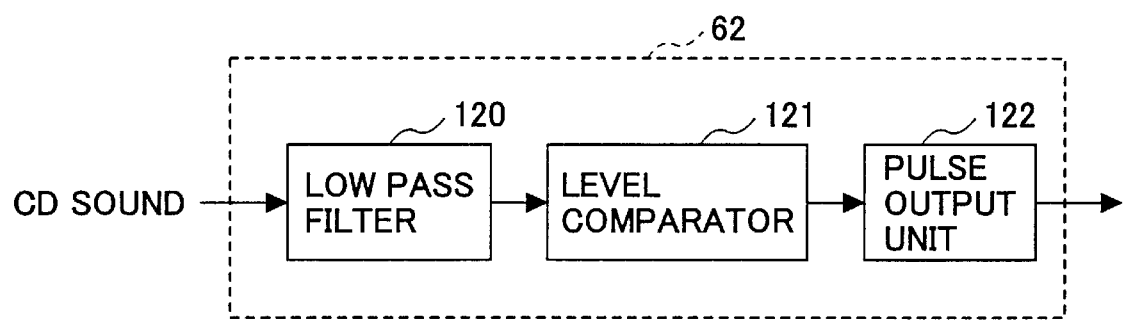
FIG. 6 is a block diagram of a BPM function shown in FIG. 3.
Figure 7A:
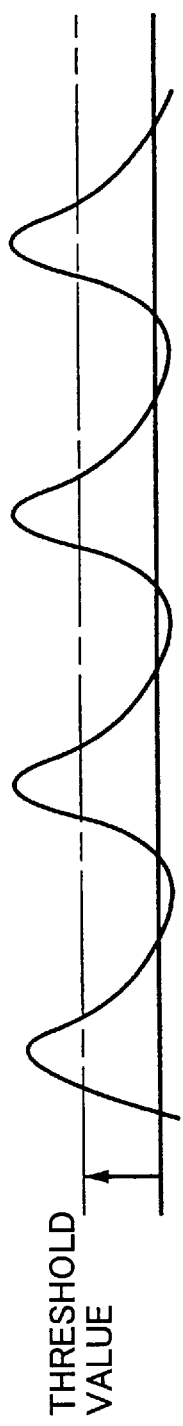
FIGS. 7A and 7B are signal waveform charts illustrating an operation by the BPM function.
Figure 7B:
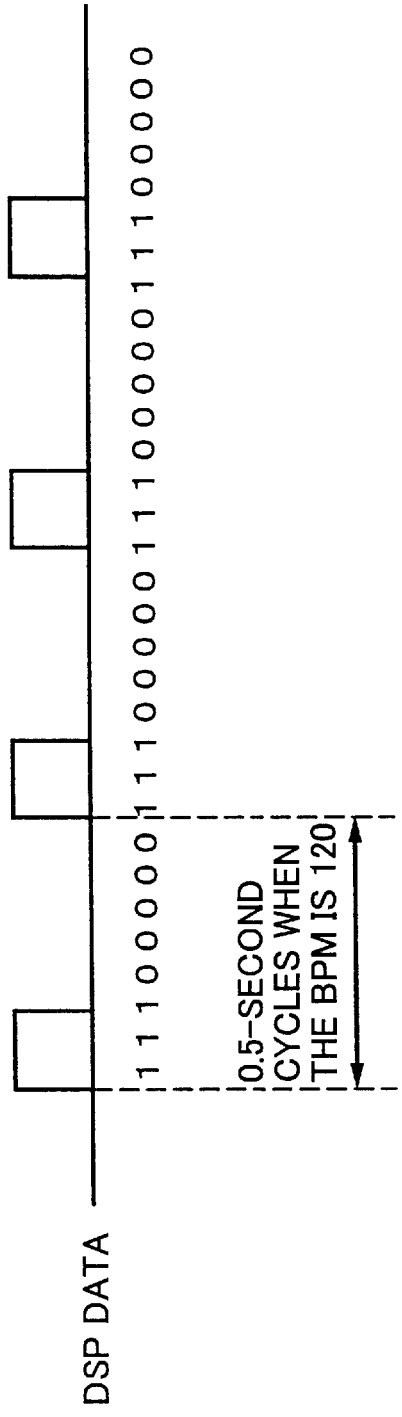

FIG. 6 is a block diagram of the BPM function 62 shown in FIG. 3. In FIG. 6, a low-pass filter 120 selectively lets only a low-frequency component, such as the sound of bass drum, among audio data supplied from the de-emphasis function 60. In a level comparator 121, the low-frequency component of the waveform shown by the solid line in FIG. 7A is compared with a set detection level shown by the broken line in FIG. 7. In accordance with the comparison result, a pulse output unit 122 generates a beat pulse and supplies the beat pulse to the main microcomputer 12. The beat pulse is high ("1") when the low-frequency component exceeds the set detection level, and is low ("0") when the low-frequency component is lower than the set detection level, as shown in FIG. 7B. In FIG. 7A, half-wave rectification has been performed on the frequency component. In a DSP, however, the number of beats is detected depending on the set detection bits in the PCM data.

The main microcomputer 12 measures the cycles of the rise and fall of the beat pulse. In some tunes, the rhythm beaten by a pass drum is not necessarily monotonous, but there might be several rhythm patterns. Therefore, the main microcomputer 12 converts the beat cycles into the number of beats. If the number of beats is in the range of 81 to 161 per minute, the number of beats is employed as the BPM value. The BPM values thus obtained for the last few times are then averaged, and the average value is displayed on the display 81.

In this embodiment, one of the recording medium reproduction apparatus shown in FIG. 4 is a master player while the other one is a slave player. The master player reproduces a first tune, and the slave player reproduces a second tune that follows the first tune without intermission.

Figure 8:
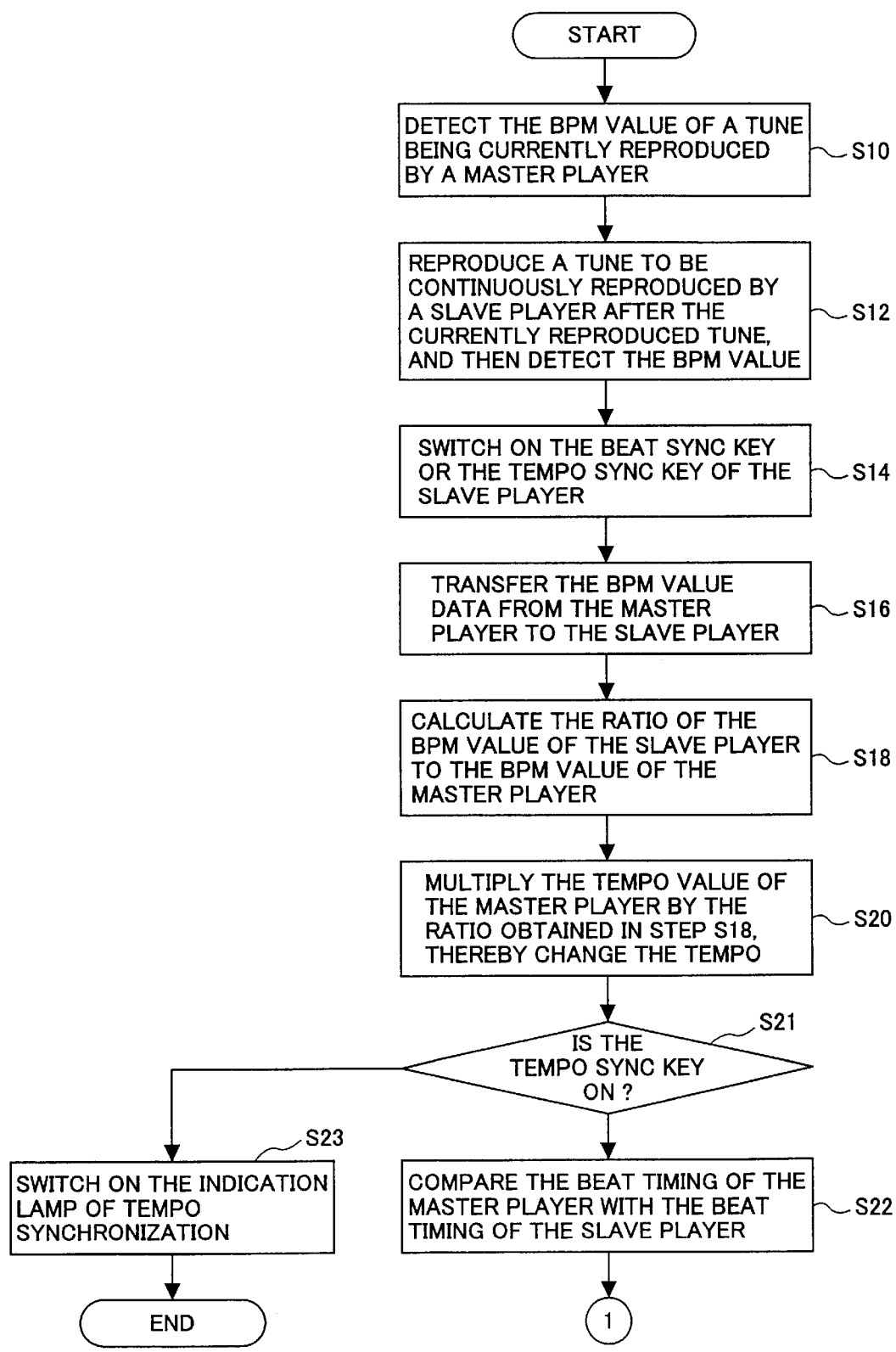
FIG. 8 is a flowchart of a beat synchronization control process of the present invention.
Figure 9:
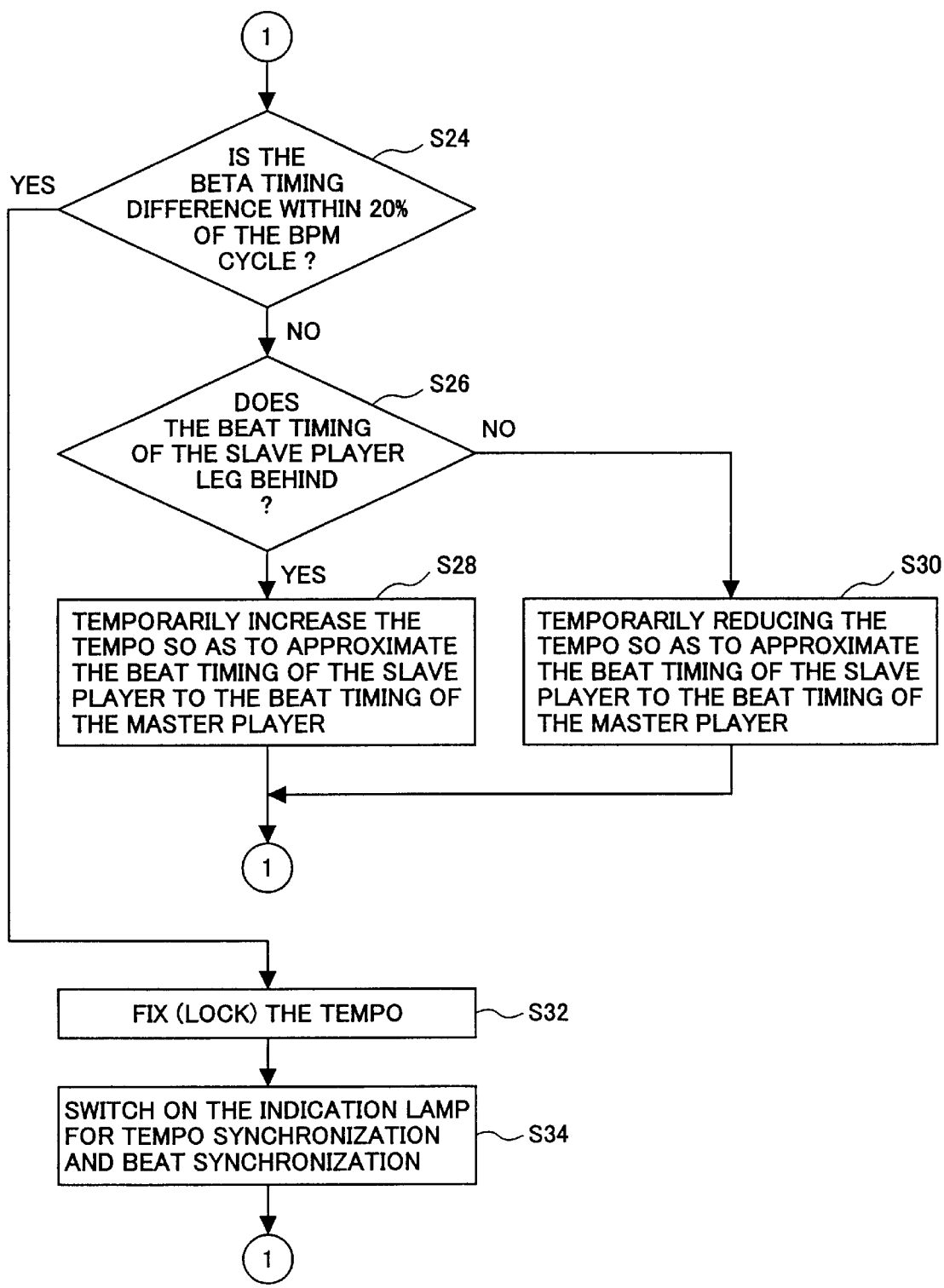
FIG. 9 is a flowchart of the beat synchronization control process that continues from FIG. 8.

FIGS. 8 and 9 are a flowchart of a beat synchronization control operation. In FIG. 8, in step S10, the beat pulse and the BPM value X of a tune being currently reproduced by the master player are detected. In step S12, a tune to be reproduced after the currently reproduced tune is reproduced by the slave player so as to detect the beat pulse and the BPM value Y. The detected BPM values X and Y are displayed on the displays 81 of the master player and the slave player, respectively. In step S14, the beat SYNC key 94 or the tempo SYNC key 93 of the slave player is switched on.

In step S16, the BPM value X of the currently reproduced tune detected by the main microcomputer 12 of the master player is transferred to the main microcomputer 12 of the slave player. In step S18, the main microcomputer 12 then calculates the ratio of the BPM value X of the tune being currently reproduced by the master player to the BPM value Y to be next reproduced without intermission by the slave player.

In step S20, the microcomputer 12 of the slave player multiplies the above ratio (X/Y) by the tempo value of the slave player (already converted into an actual number from the number in percent), so that the tune to follow the currently reproduced tune is reproduced at the obtained tempo value. Thus, the tempo of the tune to be continuously reproduced is matched to the tempo of the tune reproduced by the master player. By doing so, the BPM value Y of the tune to be continuously reproduced is matched to the BPM value X of the currently reproduced tune. In step S21, if it is determined that the tempo SYNC key 93 is on, a lamp built in the tempo SYNC key 93 for indicating tempo synchronization is switched on in step S23. After the tempo SYNC key 93 is switched on, the operation comes to an end. If the beat SYNC key 94 is switched on in step S14, the operation moves to a beat synchronization operation in step S22 and the following steps.

In step S22, the main microcomputer 12 of the slave player compares the beat pulse transferred from the master player with the beat pulse of the slave player. In step S24 of FIG. 9, the main microcomputer 12 of the slave player determines whether or not the time difference between the rising times of the beat pulses of the main player and the slave player is within the range of ±20% of a beat cycle that is an inverse number of the BPM value Y of the tune to be continuously reproduced.

If the time difference is beyond the range of ±20%, the operation moves on to step S26, in which the main microcomputer 12 of the slave player determines whether or not the rising time of the beat pulse of the slave player lags behind. If the rising time of the beat pulse of the slave player lags behind, the operation moves on to step S28, in which the main microcomputer 12 of the slave player temporarily increases the tempo of the tune to be continuously reproduced by a predetermined amount (8%, for instance), thereby approximating the rise time of the beat pulse of the tune to be continuously reproduced to the rise time of the beat pulse transferred from the master player. The operation then returns to step S24.

Meanwhile, if the rise time of the beat pulse of the slave player is ahead of time, the operation moves on to step S30, in which the main microcomputer 12 of the slave player reduces the tempo of the tune to be continuously reproduced by a predetermined amount (8%, for instance), thereby approximating the rise time of the beat pulse of the tune to be continuously reproduced to the rise time of the beat pulse transferred from the master player. The operation then returns to step S24.

If the time difference is determined to be within the range of ±20% in step S24, the operation moves onto step S32, in which the microcomputer 12 of the slave player fixes (locks) the tempo of the tune to be continuously reproduced, because the tune will sound natural to users. In step S34, the lamp built in the beat SYNC key 94 is switched on to indicate the beat synchronization between the tune being currently reproduced by the master player and the tune to be continuously reproduced by the slave player. The operation then returns to step S24.

Although the master player and the slave player automatically detect the BPM values in this embodiment, it is also possible to manually input the BPM values with TAP keys 91 on the master player and the slave player, respectively. A user can press the tap key 91 in time with a tune while listening to the tune. In such a case, the number of times the TAP key 91 is switched on in a predetermined period of time (12 seconds, for instance) from the first time when the TAP key 91 is switched on is counted. The counted value is then converted into a PBM value and displayed on each display 81 of the master player and the slave player. At the same time, the cycles of tapping the Tap key of the master player are used as the beat pulse.

Although CDs are used as recording media, it is of course possible to use DVDs (Digital Versatile Disks) and MDs (Mini Disks) as recording media.

The present invention is not limited to the specifically disclosed embodiments, but variations and modifications may be made without departing from the scope of the present invention.

The present application is based on Japanese priority application No. 2000-050082, filed on Feb. 25, 2000, the entire contents of which are hereby incorporated by reference.

What is claimed is:

1. A recording medium reproduction apparatus, comprising:

a first recording medium reproduction unit;

a second recording medium reproduction unit; and a control unit that compares the number of beats per unit time of a tune reproduced from a first recording medium with the number of beats per unit time of a tune reproduced from a second recording medium, and adjusts a reproduction rate of the second recording medium reproduction unit so that the number of beats per unit time of the second recording medium reproduction unit becomes equal to the number of beats per unit time of the first recording medium reproduction unit.

2. The recording medium reproduction apparatus as claimed in claim 1, wherein:

the first recording medium reproduction unit includes a first beat detector that detects beats of a tune being reproduced from the first recording medium;

the second recording medium reproduction unit includes a second beat detector that detects beats of a tune being reproduced from the second recording medium; and the control unit adjusts the reproduction rate of the second recording medium reproduction unit so that a beat detecting timing of the second beat detector becomes equal to a beat detecting timing of the first beat detector.

* * * * *